United States Patent
Okumura

(10) Patent No.: US 6,393,333 B1
(45) Date of Patent: May 21, 2002

(54) PRODUCTION MANAGEMENT SYSTEM

(75) Inventor: Toshihiro Okumura, Nukata-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/220,694

(22) Filed: Dec. 24, 1998

(30) Foreign Application Priority Data

Dec. 26, 1997 (JP) ............................................. 9-359512

(51) Int. Cl.[7] ............................................. G06F 19/00
(52) U.S. Cl. ...................................... 700/114; 700/115
(58) Field of Search ............................... 700/100, 108, 700/114–116

(56) References Cited

U.S. PATENT DOCUMENTS 5,050,088 A * 9/1991 Buckler ........................ 700/96
5,329,690 A * 7/1994 Tsuji ............................ 29/701
5,414,494 A * 5/1995 Aiken ........................... 399/1

FOREIGN PATENT DOCUMENTS

| JP | 4-8459 | 1/1992 |
| JP | 5-80645 | 11/1993 |
| JP | 6-162038 | 6/1994 |
| JP | 8-36538 | 2/1996 |
| JP | 9-174390 | 7/1997 |

* cited by examiner

Primary Examiner—William Grant
Assistant Examiner—Elliot Frank
(74) Attorney, Agent, or Firm—Pillsbury Winthrop LLP

(57) ABSTRACT

A production management system performs progress management of working steps applied on a workpiece in accordance with a working step flow for manufacturing a product. The production management system comprises a comment storing device for storing a comment having contents relating to a specified working step in the working step flow, an address storing device for storing address information relating to an author of the comment, and a transmitting device for, when it is confirmed that the workpiece has arrived at the specified working step, transmitting predetermined information to an address obtained from the address information stored in the address storing device.

14 Claims, 3 Drawing Sheets

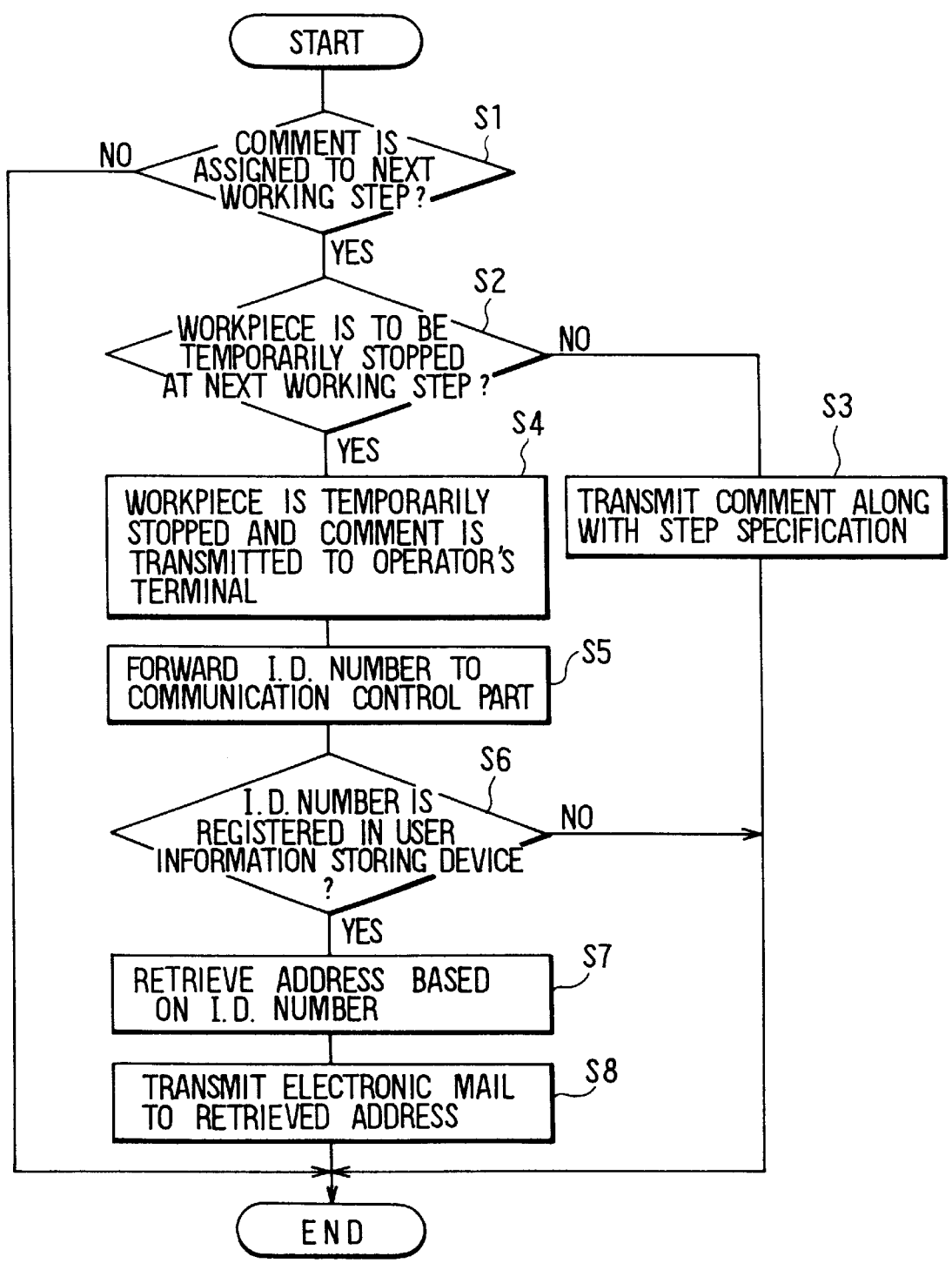

PRODUCTION MANAGEMENT SYSTEM

CROSS REFERENCE TO RELATED APPLICATION

This application is based upon and claims the benefit of priority of Japanese Patent Application No. 9-359512 filed on Dec. 26, 1998, the contents of which are incorporated herein by reference.

BACKGROUND OF THE INVENTION

1. Field of the Invention

This invention relates to a production management system for, in a production line for manufacturing products by performing a series of working steps on workpieces, performing progress management of the working steps on the workpieces, and particularly relates to a production management system with which information relating to working steps can be sent and received between operators and engineers.

2. Related Art

For example, in the manufacture of semiconductor devices, a semiconductor device process support system is employed wherein multiple working steps are set as a process flow while processing conditions in each of the working steps are determined, this process flow is stored in a database, and lot progress management and working machine control are carried out on the basis of information of the process flow. Engineer's terminals for carrying out process flow editing and the like and operator's terminals located inside clean rooms are connected to computers making up the process support system. Work instructions from engineers to operators, or comments such as "Please contact me.", "I will come and be present during the work.", or "Pay attention to tools." can be sent between these terminals.

However, according to the conventional process support systems, there has been the problem that an engineer having inputted a comment such as "Please contact me.", "I will come and be present during the work.", or "Pay attention to tools." cannot confirm whether or not the workpiece concerned has actually arrived at the working step concerned and the comment has been displayed on the operator's terminal.

However, according to the conventional process support systems, there has been the problem that an engineer having inputted a comment such as 'Please contact me.', 'I will come and be present during the work.', or 'Pay attention to tools.' cannot confirm whether or not the workpiece concerned has actually arrived at the working step concerned and the comment has been displayed on the operator's terminal.

A system for solving this problem is disclosed in Japanese Patent Application Laid-open No. H.8-36538. In this system, there is provided communication management means for, in the execution of a plurality of mutually related tasks allocated to different workers, centrally managing communication processing carried out among the different workers accompanying instructions and inquiries about the contents of the tasks. This communication management means is structured in such a manner that when there is an enquiry relating to a second task from a worker with responsibility for a first task, it finds the worker to whom that second task has been allocated and opens communication between the two workers.

That is, an enquiry from a worker is a condition of communication being started.

However, semiconductor devices manufactured through complicated processes made up of over ten steps, or several tens of steps, or in recent years as many as three hundred steps, have appeared. Further, a large number of workpieces for manufacturing numerous different kinds of semiconductor devices are put in and flows on a manufacturing line having many steps like this. Therefore, some semiconductor devices require a long process time of several months to completion. In the manufacture of this kind of semiconductor device, checking which step a certain workpiece is currently in (what the contents of the current task are) is difficult. As a result, it is, in practice, problematic that engineers who have made comments contact the operators in charge for the working step concerned with optimal timing to carry out necessary communication even when the communication management means as mentioned above is utilized.

That is, for example when an engineer wants to communicate a comment of "Please contact me." to an operator of a certain working step, the engineer who inputs the comment must passively wait for the operator to see the comment and contact him. The problem arises that if the operator fails to contact the engineer the workpiece concerned ceases to progress through the manufacturing process.

SUMMARY OF THE INVENTION

It is therefore an object of the invention to solve the problems described above and provide a production management system with which, when it is confirmed that a workpiece has arrived at a working step to which a comment has been assigned concerning the workpiece, predetermined information such as notification that the workpiece has arrived at the working step can be automatically sent to specified persons such as engineers and the like.

To achieve this and other objects, the invention provides a production management system for performing progress management of working steps applied on a workpiece in accordance with a working step flow for manufacturing a product. The production management system comprises a comment storing device for storing a comment having contents relating to a specified working step in the working step flow, an address storing device for storing address information relating to an author of the comment, and a transmitting device for, when it is confirmed that the workpiece has arrived at the specified working step, transmitting predetermined information to an address obtained from the address information stored in the address storing device.

Therefore, if, for example, address information of a design engineer is stored in the address storing device, when the workpiece has arrived at the specified working step the predetermined information is transmitted to a terminal of that design engineer. Thus, the engineer can for example go to the site of the working step and give suitable instructions to the operator in charge for the working step concerned.

BRIEF DESCRIPTION OF THE DRAWINGS

FIG. 3 is a flow chart showing control processing relating to the transmission of a comment and electronic mail.

DETAILED DESCRIPTION OF THE PREFERRED EMBODIMENTS

A preferred embodiment of the present invention applied to production management of semiconductor devices will be described with reference to the accompanying drawings.

Figure 1:
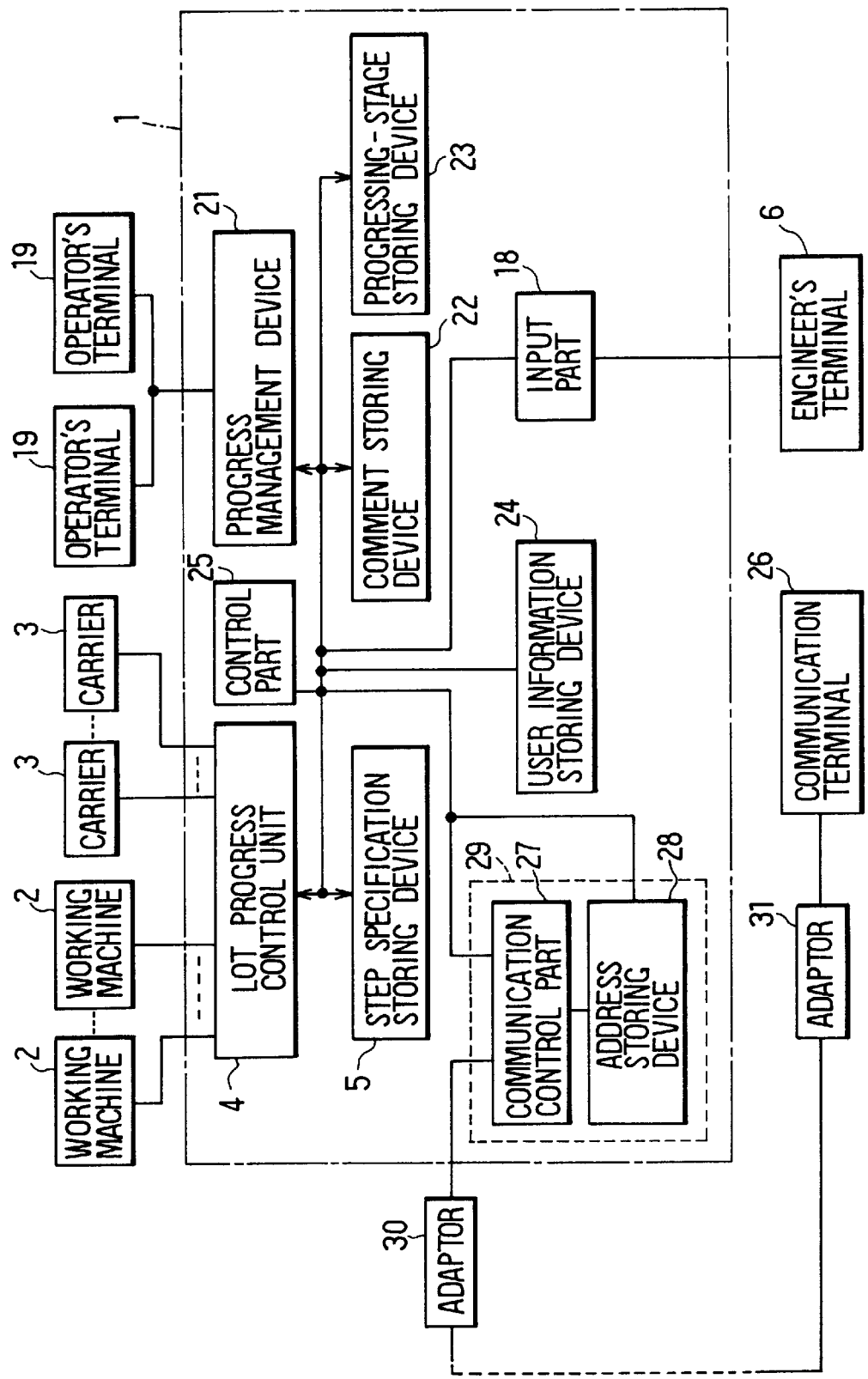
FIG. 1 is a block diagram showing the construction of a preferred embodiment of the invention.

FIG. 1 shows a production management system 1 made up of one or more computers. In FIG. 1, various kinds of working machines 2 and numerous carriers 3 are located at a semiconductor device manufacturing site. The working machines 2 process workpieces fed to the respective working steps in lot units and the carriers 3 move the workpieces between working steps and from working steps to automatic racks. These working machines 2 and carriers 3 are controlled by a lot progress control unit 4 on the basis of step specifications specified for each workpiece. The lot progress control unit 4 performs this control on the basis of step specification data that is obtained from a step specification storing device 5 which stores working step flows and working specifications in each of the working steps, for each workpiece.

Figure 2:
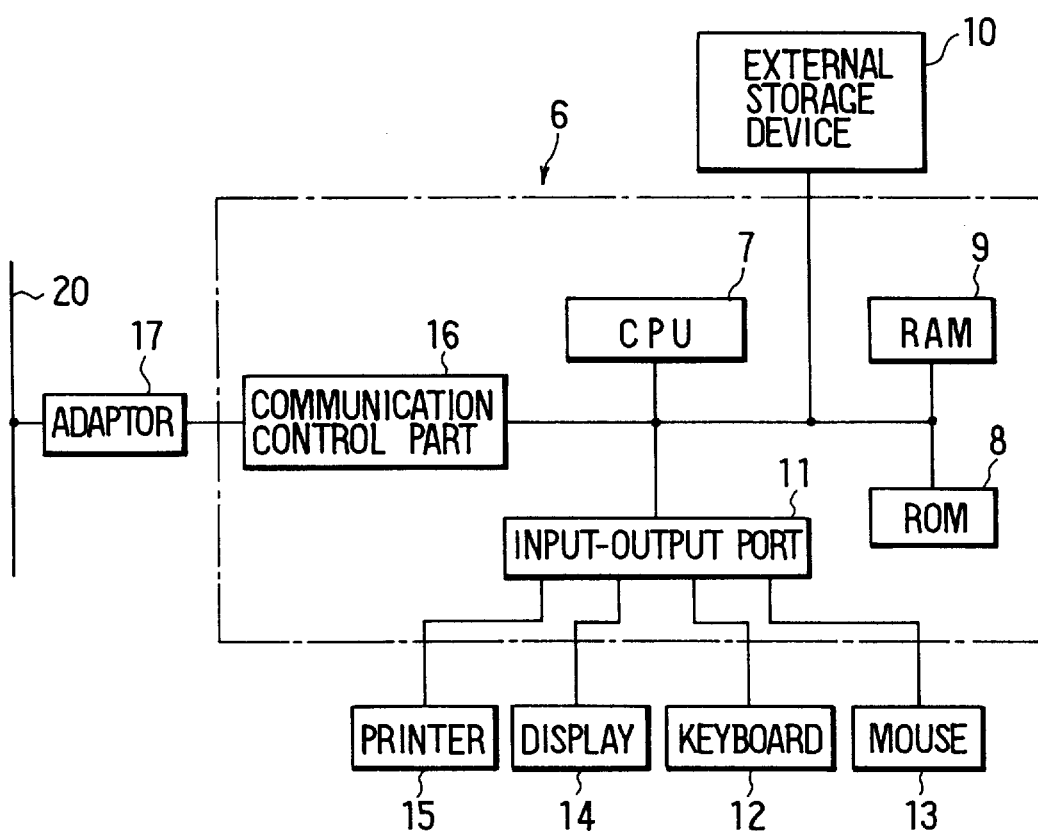
FIG. 2 is a block diagram of an operator's or engineer's terminal.

Step specification data is inputted into this step specification storing device 5 from an engineer's terminal 6 functioning as data input means. The engineer's terminal 6 consists of a personal computer, and as shown in FIG. 2 has a CPU 7 for controlling the terminal 6 as a whole, a ROM 8 for storing system programs of the terminal 6 and so on, and a RAM 9 for temporarily storing application programs and the like. An external storage device 10 such as a hard disc drive for storing various application programs is connected to the terminal 6. Also, a keyboard 12 and a mouse 13 serving as input devices, a display 14 as display means and a printer 15 as output means are connected to the terminal 6 by way of an input-output port 11 thereof.

The engineer's terminal 6 has a communication control part 16 connected by way of an adaptor 17 and a transmission line 20 to an input part 18 of the production management system 1. An engineer can input step specification data to the step specification storing device 5 while looking at a picture displayed on the display 14 and can print out inputted step specification data using the printer 15.

Operator's terminals 19 are disposed near the working machines 2. These operator's terminals 19 include personal computers similar to the engineer's terminal 6 and have communication control parts 16 connected by way of adaptors 17 to the transmission line 20 of a local area network (LAN). The transmission line 20 is also connected to a progress management device 21 of the production management system 1. The operator's terminals 19 and the progress management device 21 can send and receive signals to and from each other by way of the transmission line 20.

The lot progress control unit 4 carries workpieces of which working has been finished to automatic racks by means of a carrier 3 disposed between sites for working steps (hereinafter, inter-step carrier), and selects one or more workpieces from multiple workpieces stored in the automatic racks and carries them to the working machine 2 by means of a carrier 3 disposed inside the site of the working step (hereinafter, intra-step carrier). In the progress management of working of workpieces, the case in which the workpieces carried by the inter-step carrier 3 to an automatic rack is not being an object of selection for carrying by the intra-step carrier 3 of the next working step is defined as temporal suspension of the arrival of the workpiece at the next working step. The lot progress control unit 4 performs this determination of whether or not the arrival of the workpieces is to be temporarily suspended on the basis of the contents stored in a comment storing device 22 serving as comment storing means.

The progress management device 21 updates progress management information stored in a progressing-stage storing device 23 for each workpiece each time progress is made in the working of the workpiece. Specifically, when working of a workpiece is started in a certain working step, progress management information concerning that workpiece for that working step is updated from Pre-Working to In-Working; when that working finishes, the progress management information is updated from In-Working to Working Finished, and progress management information for the next working step is set to Pre-Working; and when the working of that next working step is started the progress management information for that next working step is updated to In-Working, and so on.

In this preferred embodiment, in progress management, the point in time at which the progress management information is updated to Pre-Working is defined as the time of a workpiece having arrived at the next working step. However, if the next working step is one at which the carrying of the workpiece is to be temporarily suspended as described above, when the progress management information with respect to the next working step is made Pre-Working, with that timing a state of temporary suspension is assumed. Accordingly, when the progress management information becomes temporarily suspension, it means that the arrival of the workpiece at the next working step has been temporarily suspended midway; however, although the carrying of the workpiece is temporarily suspended in progress management, during this time, the workpiece is being carried from the previous step to the next step, and the temporary suspension only means that after being carried to the automatic rack the workpiece does not become an object of carrying by the intra-step carrier 3. Cancellation of this temporary suspension is carried out using an operator's terminal 19, as will be further discussed later.

The lot progress control unit 4 carries the workpiece with the intra-step carrier 3, makes the working to be carried out by the working machine 2 commence when a next working step is not the object of a temporary suspension. At this time, the lot progress control unit 4 outputs a working start signal to the progress management device 21. On the basis of this, the progress management device 21 updates the progress management information with respect to the working step for that workpiece from Pre-Working to In-Working.

When a next working step is one to which a comment has been assigned, the lot progress control unit 4 starts the operation of the working machine 2 with the condition that an operator has performed an input for starting the operation of the working machine 2 at the operator's terminal 19.

That is, when the operator's terminal 19 is operated to start the working machine 2, a resulting control signal is inputted into the progress management device 21. On the basis of this control signal, the progress management device 21 outputs an operation starting command signal to the lot progress control unit 4. When the lot progress control unit 4 receives the operation starting command signal it starts the operation of the working machine 2. When the operation of the working machine 2 is started, in the same way as that described above, the progress management device 21 updates the progress management information with respect to that working step from Pre-Working to In-Working.

At a working step that is the object of a temporary suspension, the lot progress control unit 4 starts the operation of the working machine 2 when conditions for the commencement of working have been satisfied. That is, the lot progress control unit 4 starts the operation of the working machine 2 when an operator has used the operator's terminal 19 to perform an operation for cancelling the temporary suspension and an operation for starting the working machine 2.

When the operator's terminal 19 is operated to cancel the temporary suspension and to start the working machine 2, a resulting control signal is inputted into the progress management device 21. Then, on the basis of this control signal, the progress management device 21 outputs a temporary suspension cancelling command signal and an operation starting command signal to the lot progress control unit 4. When it receives the temporary suspension cancelling command signal and the operation starting command signal from the progress management device 21, the lot progress control unit 4 cancels the state of temporary suspension of the workpiece and carries the workpiece to the working machine 2 by means of the intra-step carrier 3 and then starts the operation of the working machine 2. Notification of this temporary suspension cancellation and commencement of working is fed back from the lot progress control unit 4 to the progress management device 21. The progress management device 21 cancels the temporary suspension in progress management information and updates progress management information for the workpiece with respect to the working step from Pre-Working to In-Working.

When the working of the workpiece finishes, a working completion signal is outputted from the working machine 2 to the lot progress control unit 4. Also, an operator operates a key-board of the operator's terminal 19 and thereby transmits a working completion signal to the progress management device 21. When it receives the working completion signal from the working machine 2, the lot progress control unit 4 relays it to the progress management device 21. Then, when the progress management device 21 has received the working completion signal from both the lot progress control unit 4 and the operator's terminal 19, it updates progress management information for that working step to Working Finished and updates the progress management information for the next working step to Pre-Working.

In progress management, when a workpiece has been brought in a Pre-Working state with respect to a certain working step, the progress management device 21 transmits step specification data to an operator's terminal 19 disposed near the working machine 2 of that working step. Thus an operator can see the step specification data on the display 14 of that operator's terminal 19.

In the production management system 1 of this preferred embodiment, in progress management, when a workpiece is brought into the Pre-Working state at a certain working step, that is, when the arrival of the workpiece at that working step has been confirmed, predetermined information such as comments relating to the working step for the attention of the operator stored in the comment storing device 22 as well as step specification data being transmitted to the operator's terminal 19 are transmitted to the operator's terminal 19 of the working step. Comments are inputted to the comment storing device 22 by the engineer's terminal 6. The transmission of step specification data and comments is carried out by the progress management device 21 serving as transmitting means when a comment is inputted into the comment storing device 22, the engineer's terminal 6 is used to input a name, an I.D. number and a password of the person inputting the comment; the text of the comment; the name of the workpiece to which the comment is to be assigned; and the name of the working step to which the comment is to be transmitted. The comment storing device 22 stores the name, the I.D. number and the password of the author of the comment, the text of the comment and the name of the working step to which the comment is to be sent, in the order of the working step flow for each workpiece.

When a comment is inputted to the comment storing device 22, a plurality of working steps can be specified as working steps to which that comment is to be sent. In this case, the comment storing device 22 stores the comment in association with each of the plurality of working steps. Then, when it is confirmed that the workpiece has arrived at one of the specified working steps, that is, when the workpiece is brought into a Pre-Working state at a specified working step in progress management, the progress management device 21 transmits the comment stored in association with that working step to the operator's terminal 19 disposed near the site thereof. Thus, the inputting operation can be simplified in a case where the same comment is to be sent to a plurality of working steps.

Also, a plurality of persons can input comments relating to one working step applied on a single workpiece. When the plurality of persons inputs their comments relating to a single working step, the comment storing device 22 stores a plurality of comments in association with one working step of the single workpiece. When a workpiece is brought into a state in progress management such that it arrives at a specified working step, the progress management device 21 transmits the plurality of comments stored in-the comment storing device 22 in association with that working step on that workpiece to the operator's terminal 19. Thus various comments such as those from a designer's viewpoint, a collaborating designer's viewpoint or a superior's viewpoint can all be transmitted to the operator of a requested working step in connection with a specified workpiece.

The production management system 1 has a user information storing device 24. This user information storing device 24 stores the names, company departments, I.D. numbers and passwords of registered users and information on their authority of access to respective devices. This access authority information relates to whether or not a registered user can access each of the lot progress control unit 4, the step specification storing device 5, the comment storing device 22, the progress management device 21, the progressing-stage storing device 23 and the user information storing device 24. By this means, unforeseen situations such as for example the step specification storing device 5 being accessed and its contents being tampered with can be prevented.

When a comment is inputted, a control part 25 of the production management system 1 first determines from the inputted I.D. number and password, whether or not the person inputting the comment is indeed the registered user and whether or not that user has the authority to access the comment storing device 22, on the basis of the information stored in the user information storing device 24. When the person inputting the comment agrees with the registered user and the user has the access authority, the inputting of the comment is accepted. The I.D. number, the text of the comment, the names of the workpiece and the working step to which the comment is to be sent and so on are stored in the comment storing device 22.

Contents thus stored in the comment storing device 22 can be viewed in advance at the operator's terminal 19 provided for each of the working steps. That is, when a key operation for viewing comments is carried out in the operator's terminal 19, the progress management device 21 accesses the comment storing device 22 and transmits notification of whether or not any comments to the working step are present for each of a number of workpieces. This information is displayed on the display 14 of the operator's terminal 19. Then, when an operation is carried out to select a workpiece for which it is being displayed that a comment is present, the contents of that comment is displayed on the display 14. Thus, it is possible for an operator to know the contents of comments relating to the working step in his/her charge in advance. The information on presence or absence of comments and comments themselves can also be printed out.

At each working step, contents relating to the working step stored in the comment storing device 22 is displayed on the display 14 of the operator's terminal 19 disposed near a site for the working step when it is confirmed in progress management that a workpiece has arrived at that working step. Further, when an operation for starting the working machine 2 of the working step has been carried out, the contents relating thereto stored in the comment storing device 22 is again displayed on the display 14 of the operator's terminal 19. At this time, predetermined information displayed on the display 14 is the name of the author of each comment and the text thereof. In this way, because the comments are displayed at the time of commencement of working, the comments can be reviewed and therefore mistakes can be eliminated.

Also, the production management system 1 can transmit information through, for example, the internet to a communication terminal 26 such as a personal computer of an engineer. To this end, the production management system 1 is provided with a communication system 29 made up of a communication control part 27 serving as transmitting means, for example electronic mail transmitting means, and an address storing device 28 serving as address storing means. The communication control part 27 is connected by way of an adaptor 30 to a telephone line connected to the internet, and the communication terminal 26 at the engineer's end is also connected by way of an adaptor 31 to a telephone line connected to the internet. The communication terminal 26 may be connectable to a telephone line by way of a portable telephone.

When it is confirmed in progress management that a workpiece has arrived at a working step to which a comment has been assigned for the workpiece, that is, before the start of that working step, not only the progress management device 21 transmits comments together with step specification data to the operator's terminal 19, but also the communication control part 27 transmits information relating to the workpiece having arrived at the working step to which a comment has been assigned with respect to the workpiece, for example the name and I.D. number of the author of the comment, the name of the workpiece, the text of the comment, the name of the working step at which the workpiece has arrived and the name of the working machine 2, the date and time of arrival of the workpiece, and other accompanying information, to the communication terminal 26 by electronic mail. The destination of this transmission is based on address information stored in the address storing device 28.

That is, transmission destinations are stored in the address storing device 28 in association with I.D. numbers. These transmission destinations stored in the address storing device 28 can be inputted through the engineer's terminal 6, and the contents to be inputted include the I.D. number and the address of an engineer. At this time, the address storing device 28 can store a plurality of addresses in association with the I.D. number of a single engineer. Thus, it is possible for the addresses of one or more other persons to be stored in addition to the address of the holder of the I.D. number. The communication control part 27 accesses the address storing device 28 and detects the addresses from the I.D. number of the author of the comment, and transmits the above-mentioned information by electronic mail to the detected addresses.

The operation of this system will now be described, centering on comment transmission and electronic mail transmission, with reference to the flow chart shown in FIG. 3.

The lot progress control unit 4 accesses the progressing-stage storing device 23 and selects a workpiece brought in a Working Finished state. On the basis of the working step flow stored in the step specification storing device 5, the lot progress control unit 4 drives an appropriate inter-step carrier 3 to carry the selected workpiece to the next working step. Then, the lot progress control unit 4 transmits notification of the selected workpiece and the working step to which it is being carried to the progress management device 21. On the basis of this notification, the progress management device 21 updates the management information with respect to the previous working step stored in the progressing-stage storing device 23 for the selected workpiece from In-Working to Working Finished and sets the management information with respect to the next working step to Pre-Working.

The progress management device 21 then accesses the comment storing device 22 and determines whether or not a comment has been assigned to the next working step to which the workpiece is to be carried (step S1). When the next step is not a working step to which a comment has been assigned, the progress management device 21 makes the determination 'NO' at step S1, transmits information on that no comment is assigned to the lot progress control unit 4, and ends processing. When the workpiece is carried by the intra-step carrier 3 of the next working step to the next working machine 2, the lot progress control unit 4 starts the operation of the working machine 2.

When on the other hand the next working step is one to which any comment has been assigned, the progress management device 21 makes the determination 'YES' at step S1 and transmits information, on that any comment is assigned to the next working step, to the lot progress control unit 4. Then processing proceeds to the next step S2. The progress management device 21 then accesses the comment storing device 22 and determines whether or not the next working step is a working step before which the workpiece is to be temporarily suspended. When the next working step is not a working step before which there is to be a temporary suspension, the progress management device 21 makes the determination 'NO' at step S2 and transmits notification that there will be no temporary suspension to the lot progress control unit 4.

After that, when the operator of the next working step performs a key operation on the operator's terminal 19 to start the working carried out by the working machine 2, the progress management device 21 accesses the step specification storing device 5 and the comment storing device 22 and transmits step specification data and text of comments and so on relating to the next working step to the operator's terminal 19 (step S3), and then ends processing. The progress management device 21 transmits an operation starting command to the lot progress control unit 4 and thereby starts the operation of the working machine 2.

When the next working step, to which the workpiece is being carried, is a step before which there is to be a temporary suspension, the progress management device 21 makes the determination 'YES' at step S2 and transmits information on that there is the temporary suspension before the next working step to the lot progress control unit 4. In this case, the lot progress control unit 4 carries the workpiece to an automatic rack by means of an inter-step carrier 3; however, the workpiece is not made an object of carrying by the intra-step carrier 3 of the next step to exclude from an object of the working of the next working step. The progress management device 21 sets the progress management information for the next step to a temporary suspension state, and transmits step specification data and text of comments and so on to the operator's terminal 19 (step S4) in the same way as that described above.

Then, the progress management device 21 outputs a command signal for ordering that electronic mail be transmitted to the communication control part 27. On the basis of this transmission command signal, the communication control part 27 accesses the comment storing device 22 on the basis of information of the workpiece and the working step provided by the progress management device 21 and detects the I.D. number and so on of the engineer who authored the comment to that workpiece in that working step (step S5).

Next, the communication control part 27 accesses the user information storing device 24 and determines whether or not the person having the detected I.D. number is a registered user authorized to input comments (step S6). This determination is carried out on the basis of whether or not the I.D. number is that of a person having the authority of access to the comment storing device 22. When the detected I.D. number is not that of a person authorized to send comments, the communication control part 27 makes the determination 'NO' at step S6 and ends processing. At this time, an alarm is raised.

When on the other hand the detected I.D. number is that of a person authorized to input comments, the communication control part 27 accesses the address storing device 28 and detects, from the I.D. number, the address of that person and any other addresses stored as addresses to which transmissions should be made at the same time (step S7). The communication control part 27 then transmits the name of the comment author, the text of the comment, the workpiece name and the working step name stored in the comment storing device 22 and the date and time of the temporary suspension and so on to these addresses by electronic mail (step S8), and ends processing.

Thus, when it is confirmed in progress management that the workpiece has arrived at a working step, if the working step is a step to which a comment has been assigned and before which a workpiece is to be temporary suspended, predetermined information on that the workpiece has arrived the working step is transmitted to the communication terminal 26 of the comment author.

Also, in this preferred embodiment, the author of a comment can ascertain all the comments that have been assigned with respect to a certain workpiece not only at the point in time at which it is confirmed that the workpiece has arrived at the specified working step but also at any time.

That is, the comment storing device 22 stores the names of comment authors, the contents of comments and the names of the relevant working steps in the order of the working step flow for each workpiece. When there is a request signal requesting comment transmission to the communication control part 27 from the engineer's communication terminal 26, the communication control part 27 accesses the comment storing device 22 and sends the names of comment authors, text of comments, and names of relevant working steps in the order of the working step flow to the communication terminal 26 as predetermined information. Thus, the engineer can display all the comments that have been made with respect to a certain workpiece on the display 14 of his/her communication terminal 26 in the order of the working step flow.

According to this preferred embodiment as described above, when it is confirmed in progress management that a workpiece has arrived at a working step to which a comment has been assigned for the workpiece (when the state of the workpiece becomes Pre-Working in progress management information), information reporting this is sent to the communication terminal 26 of the comment author by electronic mail using a telephone line. Therefore, it can be confirmed at the communication terminal 26 that the comment has been sent to the requested operator's terminal 19. For example, when the comment is 'I will come and be present during the work.', the engineer does not need to wait to be contacted by the operator and can go to the working step site of his/her own accord after receiving the electronic mail. Therefore, production efficiency is improved.

In this case, because a plurality of addresses can be written in the address storing device 28 in association with the I.D. number of a single person and the electronic mail is then transmitted to the communication terminals of several people, the electronic mail can be sent to, for example, colleague engineers or superiors of the engineer by writing not only the address of the communication terminal 26 of the engineer who inputted a comment but also the addresses of the colleagues or superiors. When the workpiece has arrived at the working step, if the author of the comment is out, a colleague or superior can go to the working step site and give instructions in his/her place.

Also, it is possible to select whether or not the carrying of a workpiece is temporarily suspended at a working step to which a comment has been assigned with respect to the workpiece. Therefore, it is possible to not temporarily suspend the carrying of a workpiece at every working step to which a comment has been assigned with respect to the workpiece and instead just to temporarily suspend the carrying of the workpiece and receive instructions from an engineer at particularly important working steps. This makes it possible to eliminate the confusion of detailed predetermined information being transmitted from working steps to which comments have been assigned but which are not particularly important.

Because it is possible to display all comments made with respect to a certain workpiece on the display 14 of a communication terminal 26 in the order of the working step flow at any time, an engineer can ascertain for a given workpiece that the workpiece will be temporarily suspended next as a result of what comment written by whom of where being assigned to the workpiece. Therefore, even if an engineer has forgotten a comment he inputted himself several months before, he can remind himself of the comment before the workpiece reaches the requested working step and prepare, for example, to go to the site of the working step.

The present invention is not limited to the preferred embodiment described above and shown in the drawings, and for example the following kinds of extension and modification are possible.

The transmission of electronic mail to the communication terminal 26 may be carried out for all working steps to which comments have been assigned.

The contents transmitted to the communication terminal 26 may only be information to the effect that the arrival of the workpiece at the working step has been confirmed. That is, at a certain working step, when it is expected that a workpiece will arrive at that working step in a several hours' time, it is sufficient if only information to the effect that the arrival of the workpiece has been confirmed is transmitted to the engineer who inputted a certain comment relating to that working step.

The communication terminal 26 may be disposed in the home of an engineer.

The electronic mail sent to the communication terminal 26 may be transmitted by means of so-called personal computer communication using an ordinary telephone line, or by using an in-company LAN.

To notify an engineer or the like without delay that there has been an electronic mail transmission, a signal display or an alarm sound may be generated to make the engineer aware of the transmission at the time of the electronic mail transmission, or a pocket pager may be used.

What is claimed is:

1. A production management system for performing progress management of working steps applied on a workpiece in accordance with a working step flow for manufacturing a product, the production management system comprising:

comment storing means for storing a comment having contents relating to a specified working step in the working step flow;

address storing means for storing address information relating to an author of the comment; and transmitting means for, when it is confirmed that the workpiece has arrived at the specified working step, transmitting predetermined information to at least one address obtained from the address information stored in the address storing means, wherein the comment storing means stores at least a name of a comment's author, contents of the comment, and a name of a working step to which the comment is assigned in an order of the working step flow, and the transmitting means transmits the name of the comment's author, the contents of the comment, and the name of the working step to which the comment is assigned to the address, as the predetermined information.

2. A production management system according to claim 1, wherein the transmitting means transmits the comment stored in the comment storing means to a terminal of an operator who works at the specified working step, when transmitting the predetermined information.

3. A production management system according to claim 1, wherein, when the address information relating to the author of the comment includes a plurality of addresses, the transmitting means transmits the predetermined information to all the addresses.

4. A production management system according to claim 1, further comprising determining means for determining whether or not an authored comment is to be stored in the comment storing means, and the comment storing means stores the authored comment only when the determining means determines that it is to be stored.

5. A production management system according to claim 1, wherein the comment storing means stores plural comments authored by plural persons with respect to one working step.

6. A production management system according to claim 2, wherein the comment storing means stores one comment in association with a plurality of working steps, and the transmitting means transmits the one comment to terminals of operators who work at the working steps associated therewith.

7. A production management system according to claim 1, wherein the comment storing means stores, for each of the working steps, information with respect to whether a transportation of the workpiece to the specified working step is to be temporarily suspended.

8. A production management system according to claim 7, wherein the specified working step at which the transmitting means transmits the predetermined information is a working step for which the comment storing means stores the information that the transportation of the workpiece is to be temporarily suspended.

9. A production management system according to claim 2, wherein each of terminals of operators who work at respective working steps displays information on whether or not any comment assigned to a corresponding working step exists and contents of the comment, if there is any comment.

10. A production management system according to claim 9, wherein, when an operator executes an operation for starting a working step, the contents of comment assigned to the working step is displayed on the terminal of the operator.

11. A production management system according to claim 1, wherein the comment is information to which an operator is to be referred in executing the working step to which the comment is assigned.

12. A production management system according to claim 1, wherein the predetermined information includes at least a notification that the workpiece has arrived at the specified working step and the contents of the comment stored in the comment storing means.

13. A production management system according to claim 1, wherein the transmitting means transmits the predetermined information as an electronic mail.

14. A production management system for performing progress management of working steps applied on a workpiece in accordance with a working step flow for manufacturing a product, the production management system comprising:

a comment storage module adapted to store a comment having contents relating to a specified working step in the working step flow;

an address storage module associated with the comment storage module and adapted to store address information relating to an author of the comment; and a transmitter associated with the address storage module and, when it is confirmed that the workpiece has arrived at the specified working step, adapted to transmit predetermined information to at least one address obtained from the address information stored in the address storage module, wherein the comment storage module stores at least a name of a comment's author, contents of the comment, and a name of a working step to which the comment is assigned in an order of the working step flow, and the transmitter transmits the name of the comment's author, the contents of the comment, and the name of the working step to which the comment is assigned to the address, as the predetermined information.

* * * * *